Feb. 5, 1963   L. M. ARCEMENT   3,076,582
APPARATUS FOR HANDLING PARTICULATE MATERIAL
Filed March 22, 1960   2 Sheets-Sheet 2
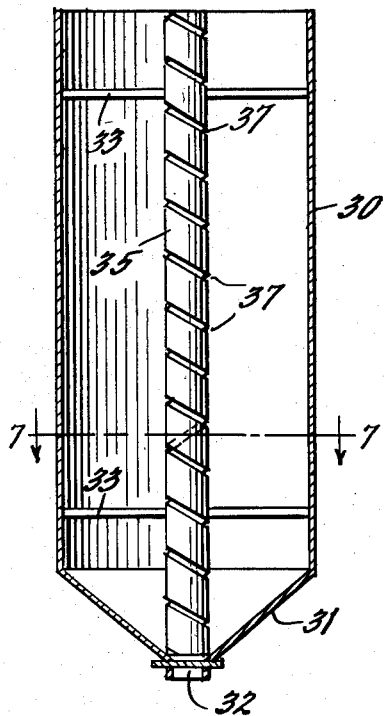
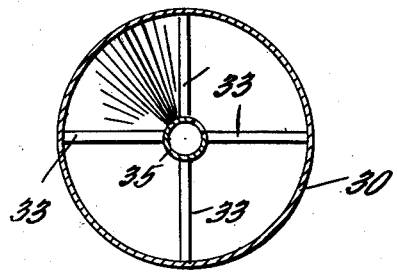
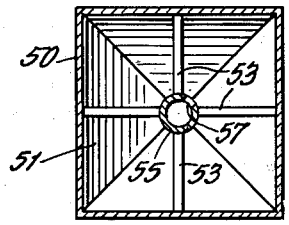
INVENTOR
*Louis M. Arcement*
BY *Samuel Stearman*
ATTORNEY

United States Patent Office 3,076,582
Patented Feb. 5, 1963

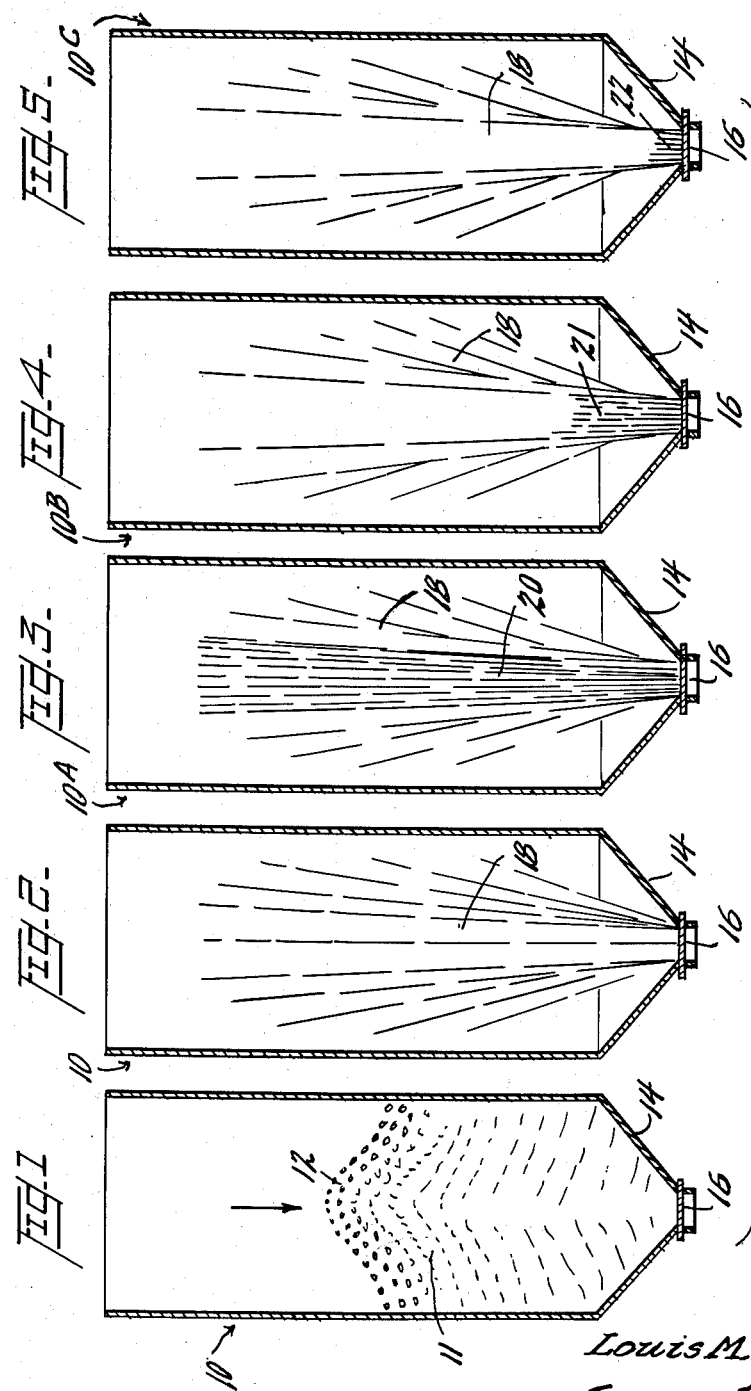

3,076,582
APPARATUS FOR HANDLING PARTICULATE
MATERIAL
Louis M. Arcement, Chalmette, La., assignor, by mesne assignments, to The Flintkote Company, a corporation of Massachusetts
Filed Mar. 22, 1960, Ser. No. 16,851
4 Claims. (Cl. 222—464)

This invention relates to method and apparatus for handling particulate material, more especially particulate materials composed of mixtures of different size particles.

Various fabricating processes require the use of particulate material composed of mixtures of particles of different sizes. In the use of such material it is usually necessary that it be transferred from one location to another.

It has long been recognized that when particulate material composed of a mixture of different size particles is transferred from one container to another, there occurs a phenomenon referred to as segregation. By the term segregation herein is meant the property of a mass of mineral, composed of various particle sizes, to separate into similarly sized portions.

When particulate material comprising mixtures of different size particles is transferred by conveyor belt, the accompanying vibration causes the smaller particles to tend to locate nearest the surface of the belt. Similarly, when such material is flowed through pipes or tubes, the smaller particles tend to locate themselves at the bottom of the flow, owing to the fact that the coarser particles flow faster and above the finer particles. In each of the two aforementioned instances, the segregation that occurs is rarely troublesome, inasmuch as a state of equilibrium is soon reached and the coarser and finer particles are delivered to the receiver at the discharge end of the conveyor or pipe at the same instant.

In marked contrast, however, is the situation when such material is charged into a silo or similar relatively large container, particularly when it is delivered at the center of the top of the container. In such instances, the finer particles accumulate at the center of the container, while the coarser particles fall toward and accumulate adjacent the wall thereof, i.e., at points more radially remote from the vertical axis of the container, and the intermediate size particles locate themselves between the finer and coarser particles.

One industrial field in which segregation of particulate material as above set forth presents a serious problem, is that concerned with the manufacture of asphalt roofing, siding and the like, wherein mineral granules are used for surfacing the asphalt coated base sheet.

In the processing and use of such granules for the manufacture of asphalt roofing, siding and the like, it is necessary that the granules be transferred from one silo or bin to another at various times. The granules used for such manufacture are conventionally of quartz or other suitable mineral base, usually of conchoidal fracture, and are composed of mixtures of differently sized particles, varying from such as pass an 8 mesh screen to such as are retained on a 35 mesh screen.

The segregation of the granules, as herein described, gives rise, in the case of granules used in the manufacture of roofing, siding, etc., to frequent undesirable fluctuations from coarse to fine in the grading of the granules at the point at which they are ultimately applied to the asphalt coated base sheet or board. These fluctuations result in objectionable deviations from the desired color or appearance of the finished roofing, siding or the like. Moreover, a deviation in grading which amounts to a content of coarser granules 10% or more in excess of the standard has an adverse effect upon the embedding qualities of the granules. On the other hand, an excess of fines frequently results in imparting an undesirable dark appearance to the finished surface of the roofing, siding or the like, owing to the fact that the tension and pressure appropriate for embedding a granule mixture of the proper grading, are too great for the finer grading. As a result, asphalt from the coating becomes squeezed up through the interstices between the granules and causes the finished sheet to present an undesired dark appearance. The foregoing and other undesirable effects of segregation are often sufficiently intense to result in production of finished roofing, siding or the like that is so off-grade as to require that it be scrapped.

The principal object of the present invention is to provide a method and apparatus capable of minimizing segregation of particulate material compound of mixtures of different size particles, normally occurring during storage and transfer of the same into and out of containers such as silos, bins and the like.

Another object of the invention is to provide a method and apparatus of the aforesaid character, for minimizing segregation of granules used in the production of asphalt roofing, siding and the like.

Still another object of the invention is to provide a method and apparatus of the aforesaid character, which may readily be installed, at relatively little expense, in silos, bins, and the like presently in service.

Briefly stated, the minimization of segregation of granules may be achieved, according to the invention, by providing along the vertical center of the containers a tubular passageway extending throughout the height of the container and connected with the discharge outlet thereof, and providing an opening or openings in the wall of the passageway, through which the particles of the mass in the container may enter the passageway for flow toward the discharge outlet in a manner which restricts the flow from the sides or laterally more remote sections of the container until uniform discharge of the material is established, whereupon the flow will be uniform more or less progressively from the top levels to the bottom levels of the mass in the container.

The invention will be more readily apparent from the description herebelow, and from the accompanying drawings, in which:

FIGS. 1 to 5, inclusive, are views diagramatically depicting the phenomenon of segregation as it normally occurs in transferring, from one silo to another, particulate material composed of a mixture of differently sized particles, as in the case of roofing granules;

FIG. 6 is a view partly in elevation and partly in cross-section, illustrating a silo constructed for practising the present invention;

FIG. 7 is a view thereof taken along line 7—7 of FIG. 6; and

FIG. 8 is a view similar to FIG. 7, illustrating the invention as applied to a silo or like container of square cross-sectional configuration.

As briefly stated above, when particulate material such as granules used in the roofing industry are charged into a silo at the center of the top of the silo, the smaller size particles accumulate adjacent the center of the silo, whereas the coarser particles fall outwardly towards the side of the silo and the intermediate size particles locate themselves between the fine and the coarse particles. The ultimate result of this inherent tendency exhibited by the granules is illustrated in FIG. 1. As there depicted, the material charged into the silo, indicated by numeral 10, deposits more or less naturally in the form of cones, indicated at 11. Generally, these cones have their peaks 12 disposed more or less in vertical alignment with the truncated ends of the inverted cone bottom 14 of the silo. By virtue of their size, the coarser particles, as they fall and strike the peak of a cone 11, tend to roll down to the base of the cone and towards the wall of the silo. On the other hand, the finer particles have greater resistance to flow or roll and, therefore, tend to remain where they strike, namely, at or adjacent the center and peak of the cone.

When the outlet 16 of a silo thus charged with granules is opened for discharge of its contents, the initial flow and discharge naturally occurs immediately above the discharge opening where all resistance has been removed. Consequently, as depicted in FIG. 2, there is formed in the mass what is commonly referred to as a funnel, indicated at 18, into which the particles from the more radially remote portions of the mass will follow by flowing towards the center, to be eventually discharged.

Now assume the granules are required in manufacture, shipping, or use, to be transferred from silo 10A (FIG. 3) to silo 10B (FIG. 4). In charging silo 10A, some degree of segregation will have occurred as above explained. The portion represented by the shaded area 20 in FIG. 3 (commonly referred to as the "deconing" section) when delivered to silo 10B will become further segregated as explained above, so that the portion of the granules represented by shaded area 21 in silo 10B is considerably finer in its size grading than that of area 20 in silo 10A. Since the granules of area 20 in silo 10A are discharged first, in the "deconing" of silo 10A, they again become partially denuded of the coarser granules by virtue of the transfer from silo 10A to silo 10B. Similarly, when the granules in silo 10B are required to be transferred to a third silo, as silo 10C (FIG. 5), the granules in the shaded area 21 of silo 10B are discharged first in the "deconing" of silo 10B, and as a result of their transfer to silo 10C, the granules occupying the shaded area 22 in silo 10C are further denuded of coarse particles and hence will have a grading with an excess of fine particles. Consequently, for example, if the silo 10C is a bin disposed directly over a moving sheet of asphalt coated roofing felt or the like, and contains granules which are to be deposited directly onto such coated sheet, there will be fluctuations, from time to time, in the grading of the granules deposited on the sheet; that is to say, the grading will at times be excessively coarse while at other times it will be excessively fine, thereby giving rise to serious objections, such as those above mentioned.

The extent of segregation which occurs as above set forth may be more readily appreciated when stated quantitatively. Thus, for example, actual volumetric determinations which have been made show that the proportionate volume of granules in the deconing of a circular silo 20 feet in diameter and 50 feet high (slightly in excess of 15,000 cubic feet and capacity content of about 675 tons of mineral granules) is above 15% and, as indicated, would be off-grade on the fine side. Hence, this off-grade portion would amount to about 2250 cubic feet or 100 tons of the total 675 tons. In transferring the material from such a silo to another of equal size, the 100 tons from the deconing of the first silo will spread to all sections of the second silo, but in doing so will segregate still further and, again considering only the center section of the second silo, this will amount to approximately 15% of 100 tons, namely, 15 tons, which will form a part of the deconing portion of the second silo. However, that portion will contain a larger percentage of fine granules than any other portion. If the contents of the second silo are then transferred to a third silo of the same size, 15% of the 15 tons, namely 2¼ tons thereof, will constitute the center section in the third silo. Thus, as will be seen, even when dealing with relatively large quantities of material, the segregation that occurs results in the formation of a relatively small portion, yet substantial amount, containing a high percentage of the finer granules.

Efforts have heretofore been made to counteract the effects of segregation of roofing granules under the influences above stated, by dividing or quartering the silos and locating the top fill hole and the bottom discharge hole on opposite sides of each other relative to the vertical axis of the silo. Dividing and quartering the silos has the effect of merely reducing segregation by reducing the diameter and hence reducing the spread of the granules. The relocation of the fill and discharge holes effects a positioning of the granules so that the peak 12 of cone 11 (FIG. 1) will be disposed relatively close to the wall of the silo, resulting in granules of the larger sizes being the initially discharged portion, by virtue of the reduction of the height and base diameter of the deconing section.

In accordance with the present invention, segregation of granules under the influences described is minimized by establishing within the container a path of flow for the granules whereby upon opening of the discharge outlet, the flow of granules from the side sections of the container is restricted, thereby reducing the volume of the deconing section and enabling the flow of granules thereupon to proceed toward the discharge outlet substantially uniformly and more or less progressively from the top levels to the bottom levels of the mass.

The path of flow for achieving the aforementioned result in accordance with the invention comprises, essentially, a tubular passageway, of a diameter equal to or slightly greater than that of the discharge outlet, extending vertically within the container from the top thereof down to the discharge outlet, and having in the wall thereof an opening or openings extending circumferentially around the wall from the uppermost to the lowermost ends of the passageway.

The path of flow as aforementioned is adaptable, in the practise of the invention, for use with square containers having an inverted-pyramid bottom section leading to a discharge outlet at the center of the container bottom, as well as for use with cylindrical containers having an inverted-cone bottom section leading to a discharge outlet at the center of the container bottom.

With the foregoing ends in view, the container may be in the form of a cylindrical silo 30 (FIGS. 6 and 7) having an inverted-cone bottom 31 leading to a central discharge spout 32.

The tubular passageway within the container for causing the granules to flow in the manner above described when discharged therefrom is indicated at 35. This passageway extends the entire height of the container coaxially with the discharge outlet and has its lowermost end terminating at the discharge outlet.

The openings or entrances into pasageway 35 are indicated as 37. These openings extend around the periphery of the passageway at intervals spaced axially thereof.

The axial dimension of the entrances 37 will depend upon the size grading of the granules to be handled and more or less upon the desired rate of discharge from outlet 32. As will be understood, this dimension must in any event be somewhat in excess of the largest size granules to be handled. However, it may be in excess thereof by an amount ranging up to about one fourth the diameter of the discharge outlet. Thus, for example, in the case of a cylindrical silo having a diameter of twenty feet and a discharge outlet of twelve inches diameter, the axial dimension of the entrances 37 may be from one-half inch to three inches. For the handling of conventional size roofing granules in such a silo, the axial dimension of entrances 37 may conveniently be about one inch.

In the specific embodiment of the invention illustrated in FIGS. 6 and 7, the passageway 35 with its entrances 37 is comprised of a band of metal, or other suitably flexible material, wound or otherwise formed into a helical tube. This tube is disposed in container 30 with its axis in alignment with the axis of discharge outlet 32, and may be supported in position by means of radially extending brace rods 33. The band is wound in the form of a helical tube having a diameter slightly in excess of that of the discharge outlet 32, and a spacing between successive convolutions to provide the desired size openings or entrances into the passageway 35.

By means of the passageway 35 having the spiral or like entrances above described, the volume of the initial deconing portion is reduced, so that the granules discharged through outlet 32 will thereupon be of uniform size grading, and the flow of granules at the discharge outlet will proceed progressively more or less from the top to the bottom levels of the mass through the spirally disposed entrances 37 of the passageway leading into the discharge outlet 32.

In the embodiment of the invention shown in FIGS. 6 and 7, the silos are, as stated, of the cylindrical type, having an inverted-cone bottom leading to the discharge outlet.

The invention, however, is readily adaptable to non-cylindrical containers, such as square silos or bins, as in the embodiment illustrated in FIG. 8. As there shown, the container 50 is square in cross-section, and accordingly, has its bottom section 51 (corresponding to portion 31 of the silo shown in FIGS. 6 and 7) in the form of an inverted-pyramid with its truncated end joining the discharge outlet 52.

In order to provide for flow of granular material in its discharge from a square type container as represented in FIG. 8, in the manner described in connection with FIGS. 6 and 7, there is positioned within container 50 a tubular passageway 55, supported by radially disposed brace rods 53, and extending vertically from the top of the container down to and in axial alignment with the discharge outlet 52 at the lower end of the inverted-pyramid bottom section 51. As in the embodiment shown in FIGS. 6 and 7, the tubular passageway 55 is of a diameter slightly in excess of that of the discharge outlet 52, and is formed with an opening 57 extending in a helical path around the periphery thereof, these openings being formed and dimensioned as described in connection with the embodiment of FIGS. 6 and 7.

Although the invention has been described above with particular reference to the handling of granules used in the manufacture of asphalt roofing and siding, it will be apparent that it is equally applicable to the handling of other particulate material composed of mixtures of different sizes. Thus, the invention may be used in connection with silos, bins or other containers of the type described, employed for handling mixtures of different sized aggregate which exhibit the segregation tendency herein referred to.

I claim:

1. Apparatus for handling particulate material composed of particles of different sizes and required to be transferred from one location to another, comprising a vertically elongated container adapted to be charged with said material at the center of the top thereof, said container having a downwardly and inwardly inclined bottom section and a discharge outlet disposed centrally of the bottom thereof, and a flow control member disposed in said container, said member comprising a stationary elongated tube positioned vertically in said container in axial alignment with said discharge outlet and having a diameter slightly greater than that of said outlet, the wall of said tube having an opening extending in a helical path therearound from the top to the bottom thereof, said tube extending throughout the height of said container and having its lowermost end disposed at said discharge outlet.

2. Apparatus as defined in claim 1 wherein said container is of cylindrical cross-section and has an inverted-cone bottom portion.

3. Apparatus as defined in claim 1, wherein said container is of square cross-section and has an inverted-pyramid bottom portion.

4. Apparatus as defined in claim 1, wherein the axial distance between the opposed edges of said helical opening exceeds the size of the largest particles of said particulate material by an amount within the range of up to about one-fourth the diameter of said discharge outlet.

References Cited in the file of this patent

UNITED STATES PATENTS

| | | |
|---|---|---|
| 413,720 | Henderson | Oct. 29, 1889 |
| 1,971,716 | Hitchcock | Aug. 28, 1934 |
| 2,117,747 | Smith | May 17, 1938 |
| 2,529,583 | Adams | Nov. 14, 1950 |
| 2,562,427 | Hurter | July 31, 1951 |
| 2,613,832 | Ogorzaly | Oct. 14, 1952 |
| 2,630,906 | Philipp | Mar. 10, 1953 |